US011494745B1

(12) United States Patent
Sanzzi et al.

(10) Patent No.: US 11,494,745 B1
(45) Date of Patent: Nov. 8, 2022

(54) SAVER BUTTON

(71) Applicant: United Services Automobile Association (USAA), San Antonio, TX (US)

(72) Inventors: Fernando Sanzzi, San Antonio, TX (US); Jon Jureczki, San Antonio, TX (US); Marty Lee Mendivil, San Antonio, TX (US); Ingeborg Nolf Burch, San Antonio, TX (US); Vikram Randhir Parekh, San Antonio, TX (US); Christine Catsifas, San Antonio, TX (US); Meagan Marie Trahan, San Antonio, TX (US); Jess W. Gingrich, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 62 days.

(21) Appl. No.: 17/033,426

(22) Filed: Sep. 25, 2020

Related U.S. Application Data (63) Continuation of application No. 15/496,843, filed on Apr. 25, 2017, now Pat. No. 10,825,000.

(Continued)

(51) Int. Cl.
*G06Q 20/10* (2012.01)
*G06Q 40/02* (2012.01)
(Continued)

(52) U.S. Cl.
CPC ............ *G06Q 20/10* (2013.01); *G06Q 20/108* (2013.01); *G06Q 20/40145* (2013.01);
(Continued)

(58) Field of Classification Search
None
See application file for complete search history.

(56) References Cited

U.S. PATENT DOCUMENTS 8,548,906 B1 * 10/2013 Pellican ................. G06Q 20/10
705/40
8,639,622 B1 1/2014 Moore et al.
(Continued)

FOREIGN PATENT DOCUMENTS

EP 0992012 A1 4/2000
EP 1312012 A1 5/2003

OTHER PUBLICATIONS

Gusev, Marjan K., E-Deposit in Academic Use, Jan. 1, 2002, ITI 2002, Proceedings of the 24th International Conference an Information Technology Interfaces (IEEE Cat. No.02EX534) ,pp. 343-348 vol.1,Year: 2002.

(Continued)

*Primary Examiner* — David P Sharvin
(74) *Attorney, Agent, or Firm* — Perkins Coie LLP (57) ABSTRACT

The technology described includes a physical, connected device/button, that when pressed or clicked, causes money to be transferred according to a set of rules (i.e., a "one-click" transfer of funds). In some embodiments, each click can cause a small, pre-set increment of money to be transferred from a user's checking account to the user's savings account. In other embodiments, the user can hold the button down for a longer period of time, indicating a request for a larger amount of money to be transferred.

20 Claims, 10 Drawing Sheets

Related U.S. Application Data (60) Provisional application No. 62/327,553, filed on Apr. 26, 2016.

(51) Int. Cl.
*G07F 7/10* (2006.01)
*G06Q 20/40* (2012.01)

(52) U.S. Cl.
CPC ............... *G07F 7/10* (2013.01); *G06Q 20/40* (2013.01); *G06Q 40/02* (2013.01)

(56) References Cited

U.S. PATENT DOCUMENTS

| | | |
|---|---|---|
| 9,972,004 B1 | 5/2018 | Donavalli et al. |
| 10,296,964 B1 * | 5/2019 | Rausch ............... G06Q 30/0635 |
| 11,144,988 B1 | 10/2021 | Choi et al. |
| 2009/0030840 A1 * | 1/2009 | Kane .................. G06Q 20/4037 705/44 |
| 2011/0145109 A1 | 6/2011 | Watson |
| 2011/0208588 A1 | 8/2011 | Joa et al. |
| 2015/0026055 A1 | 1/2015 | Caiman et al. |
| 2015/0078586 A1 * | 3/2015 | Ang ........................ H03G 1/00 381/109 |
| 2016/0125408 A1 | 5/2016 | Crawford |
| 2017/0186096 A1 | 6/2017 | Eramian |
| 2017/0193501 A1 | 7/2017 | Cole et al. |

OTHER PUBLICATIONS

Woodfruff, L.F., A System of Electric Remote-Control Accounting, Feb. 1, 1938, Electrical Engineering, vol. 57, Issue: 2, pp. 78-87, Year: 1938.

PNC's Virtual Wallet Takes Online Banking to the Next Level, https://pnc.mediaroom.com/index.php?s=3473&item=74221, Aug. 5, 2008, Year: 2008.

U.S. Appl. No. 15/496,843, filed Apr. 25, 2017, Saver Button.

U.S. Appl. No. 62/327,553, filed Apr. 26, 2016, Saver Button.

Cadena, Ximena et al., Remembering to pay? Reminders vs financial incentives for loan payments No. w17020, National Bureau of Economic Research, year: 2011.

* cited by examiner

SAVER BUTTON

CROSS-REFERENCE TO RELATED APPLICATIONS

This application is a continuation of U.S. patent application Ser. No. 15/496,843, filed Apr. 25, 2017, now allowed, which claims priority to U.S. Provisional Application No. 62/327,553, filed Apr. 26, 2016, entitled "SAVER BUTTON," both of which are hereby incorporated by reference in their entirety for all purposes.

TECHNICAL FIELD

Various embodiments of the present disclosure generally relate to a saver button. More specifically, various embodiments of the present disclosure relate to methods and systems for registering and operating a saver button and processing requests received from the saver button.

BRIEF DESCRIPTION OF THE DRAWINGS

Embodiments of the present disclosure will be described and explained through the use of the accompanying drawings in which.

DETAILED DESCRIPTION

Various embodiments of the present disclosure relate generally to a saver button. More specifically, various embodiments of the present disclosure relate to methods and systems for registering and operating a saver button and processing requests made from the saver button.

Currently, there is no "easy button" to assist a user with saving money at any time. To transfer funds from one account to another account, a user must log in to an account, select a first account to transfer money from, select a second account to transfer money to, and specify an amount of money. Even if the user has pre-set a schedule to automatically transfer money, the user has to endure all the above-mentioned steps if the user wants to conduct a money transfer spontaneously to move a few extra dollars from a checking account into a savings account. The saver button described herein enables members to save more frequently and more easily by simply clicking a button. Moreover, the saver button makes the act of saving tangible and exciting. In some embodiments, the saver button is a small, trans-portable device that can be taken and used anywhere.

The saver button is a physical, connected (e.g., Bluetooth, Wi-Fi) device having at least one button that, when pressed or clicked, causes money to be transferred according to a set of rules (i.e., a "one-click" transfer of funds). For example, in some embodiments, each click can cause a small, pre-set increment of money to be transferred from a user's checking account to the user's savings account. In some embodiments, the user can hold the button down for a longer period of time, indicating a request for a larger amount of money to be transferred.

A user can register the saver button to associate the saver button with one or more accounts. Registration can include providing the serial number of the saver button, account numbers, user preferences (e.g., amount to transfer with each button push, accounts to transfer from/to, restrictions), mobile or other device information, and/or network information. Receiving such information can activate the saver button for saving when a click is received.

The saver button can communicate with a saver button platform using one or more communication networks and techniques. In some embodiments, the saver button communicates with the saver button platform through a proxy such as a mobile device. In such cases, the saver button can be paired with the mobile device, and, when the saver button is pushed, the saver button sends a message to the mobile device, which in turn sends a message to the saver button platform. In other embodiments, the saver button uses Wi-Fi or other communication network(s) to communicate directly with the saver button platform without using a proxy.

In some embodiments, the saver button can be used with more than one account. The account to transfer money to/from can depend on the operator of the saver button. The identity of the operator may be determined by detecting the proximity or identity of nearby devices (e.g., geolocation, Bluetooth), by receiving authentication information (e.g., fingerprint, voice print), and/or an identity of the proxy device.

Although the saver button is primarily described as being a device for transferring money, the saver button can be used for other purposes, such as to initiate stock trades, invest in mutual funds, request a call from a specific department within an organization, and/or request that account balances be provided. In some implementations, the saver button can be combined with other tools. For example, depressing the button can result in an overview of the user's budget being sent to the user, or points can be earned towards a savings game.

As used herein, the term "user" is used synonymously with any person or individual. In the following description, for the purposes of explanation, numerous specific details are set forth in order to provide a thorough understanding of embodiments of the present disclosure. However, it will be apparent on reading the disclosure to one skilled in the art that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical disks, ROMs, random-access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 1:
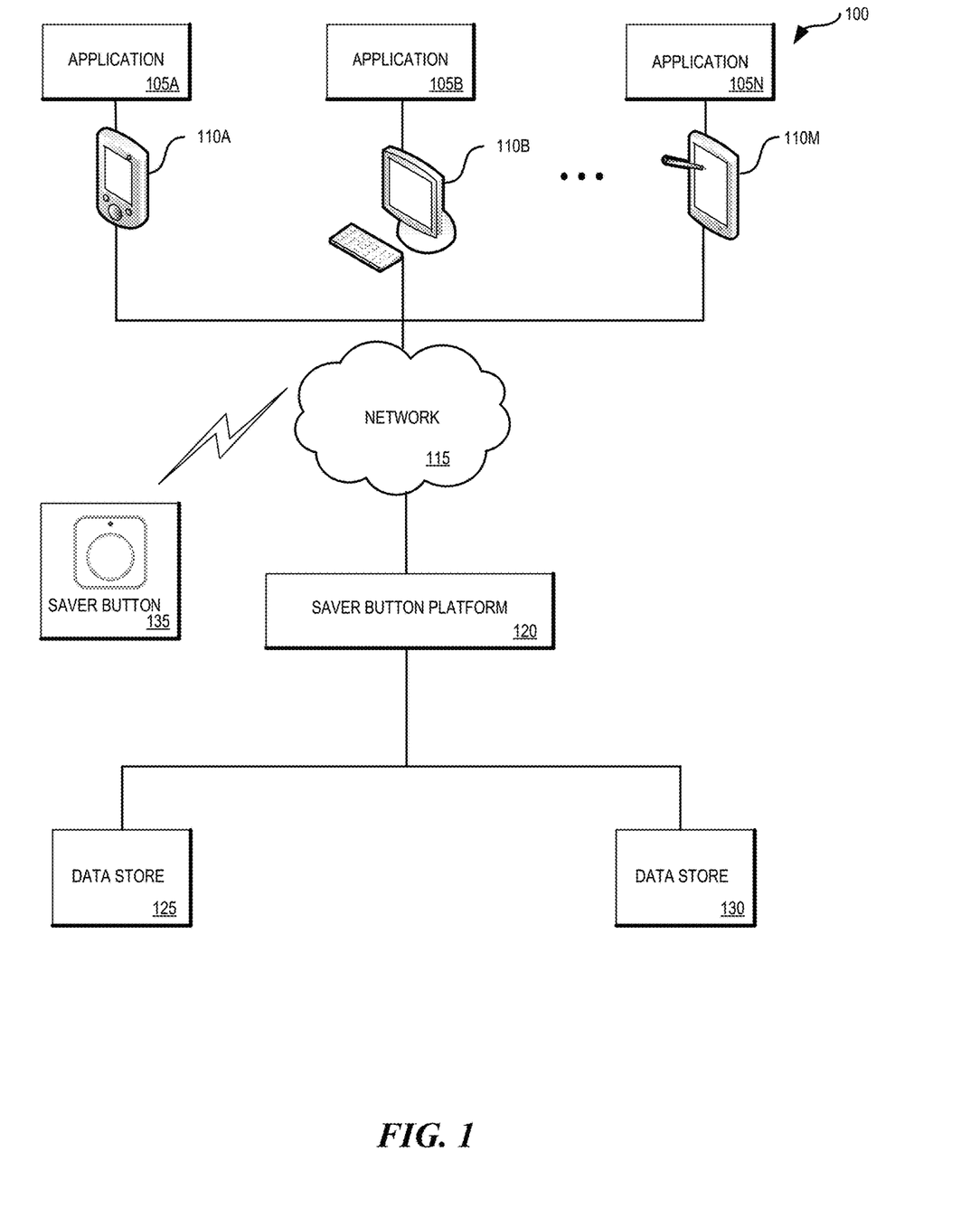
FIG. 1 illustrates an example of a network-based operating environment in accordance with various embodiments of the present disclosure.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (e.g., a mobile device; a mobile phone; a telephone; a tablet computer; a mobile media device; a mobile gaming device; a vehicle-based computer; a dedicated terminal; a public terminal, desktop, or laptop computer; a kiosk; wearable devices such as a smartwatch). In some embodiments, applications 105A-105N may be stored on one or more computing devices 110A-110M or may be stored remotely on a server (in the "cloud"). These computing devices can include mechanisms for receiving and sending traffic by connecting through network 115 to saver button platform 120, saver button 135, and data stores 125 and 130.

FIG. 1 also shows saver button 135 connected via network 115 to saver button platform 120. As described above, saver button 135 is a physical, connected (e.g., Bluetooth, Wi-Fi) device having at least one button that, when clicked, causes money to be transferred according to a set of rules. In response to receiving a "click" of its button, saver button 135 can send a request to transfer funds directly to saver button platform 120 via network 115. In other embodiments, saver button 135 can send a request to transfer funds to computing devices 110A-110M running applications 105A-105N, and the computing devices 110A-110M in turn communicate the request to saver button platform 120.

In some embodiments, saver button 135 can include a light that indicates a savings level of the user over a period of time (e.g., an area of the saver button exhibits a certain color or pattern of light if the user has met a savings goal for a week/day/month). In other embodiments, the light can indicate an identity of the operator and/or where the money will be transferred (e.g., when money will be transferred into a primary user's account, the light is blue; when money will be transferred to the user's son's account, the light is yellow). In some embodiments, the light can indicate an amount that will be transferred (e.g., yellow light means $5, purple light means $10). In other embodiments, the color can indicate restrictions (e.g., a blinking red light indicates that there is not enough money in the user's account to perform the transfer). The button may include other indicators (e.g., chirping, vibration) to convey a message.

In some embodiments, the user can hold down the button to indicate an amount of funds to transfer (e.g., holding down the button for more than one second increases the amount transferred). Saver button 135 may provide messages to the user. In some embodiments, saver button 135 may provide reminders such as "You have reached 50% of your savings goal for the week" or a confirmation such as "You just transferred $5 to your savings account." The messages and indications of the saver button can be specified by the user when the user registers the device.

Computing devices 110A-110M may be configured to communicate via the network 115 with saver button platform 120. In some embodiments, computing devices 110A-110M can retrieve or submit information to saver button platform 120 and run one or more applications 105A-105N with customized content retrieved by saver button platform 120 and data stores 125 and 130. For example, computing devices 110A-110M can execute a browser application or a customized client to enable interaction between the computing devices 110A-110M, saver button 135, saver button platform 120, and data stores 125 and 130. In some embodiments, saver button platform 120 can be a server. In an example, computing devices 110A-110M may be used to register saver button 135 and, in some implementations, receive an indication of a button push from saver button 135. Thereafter, computer devices 110A-110M may submit the request to saver button platform 120 to complete the funds transfer. In some embodiments, computing devices 110A-110M may receive a follow-up communication from saver button platform 120 that the funds transfer is complete, which in turn can be communicated to saver button 135 to notify the user (e.g., flashing lights, buzzing, chirping, voice memo). In some embodiments, saver button 135 receives the message directly from saver button platform 120.

Network 115 can be any combination of local area and/or wide area networks, using wired and/or wireless communication systems. Network 115 can be or could use any one or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 115 may be represented using technologies, languages, and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

Data stores 125 and 130 can be used to manage storage and access to user data such as user profiles, account information, authentication information, transfer rules (e.g., pre-set transfer amounts, transfer restrictions), and employment history. Data stores 125 and 130 may be a data repository of a set of integrated objects that are modeled using classes defined in database schemas. Data stores 125 and 130 may further include flat files that can store data. Saver button platform 120 and/or other servers may collect and/or access data from the data stores 125 and 130. Information provided by users can be stored in data stores 125 and 130.

Figure 2:
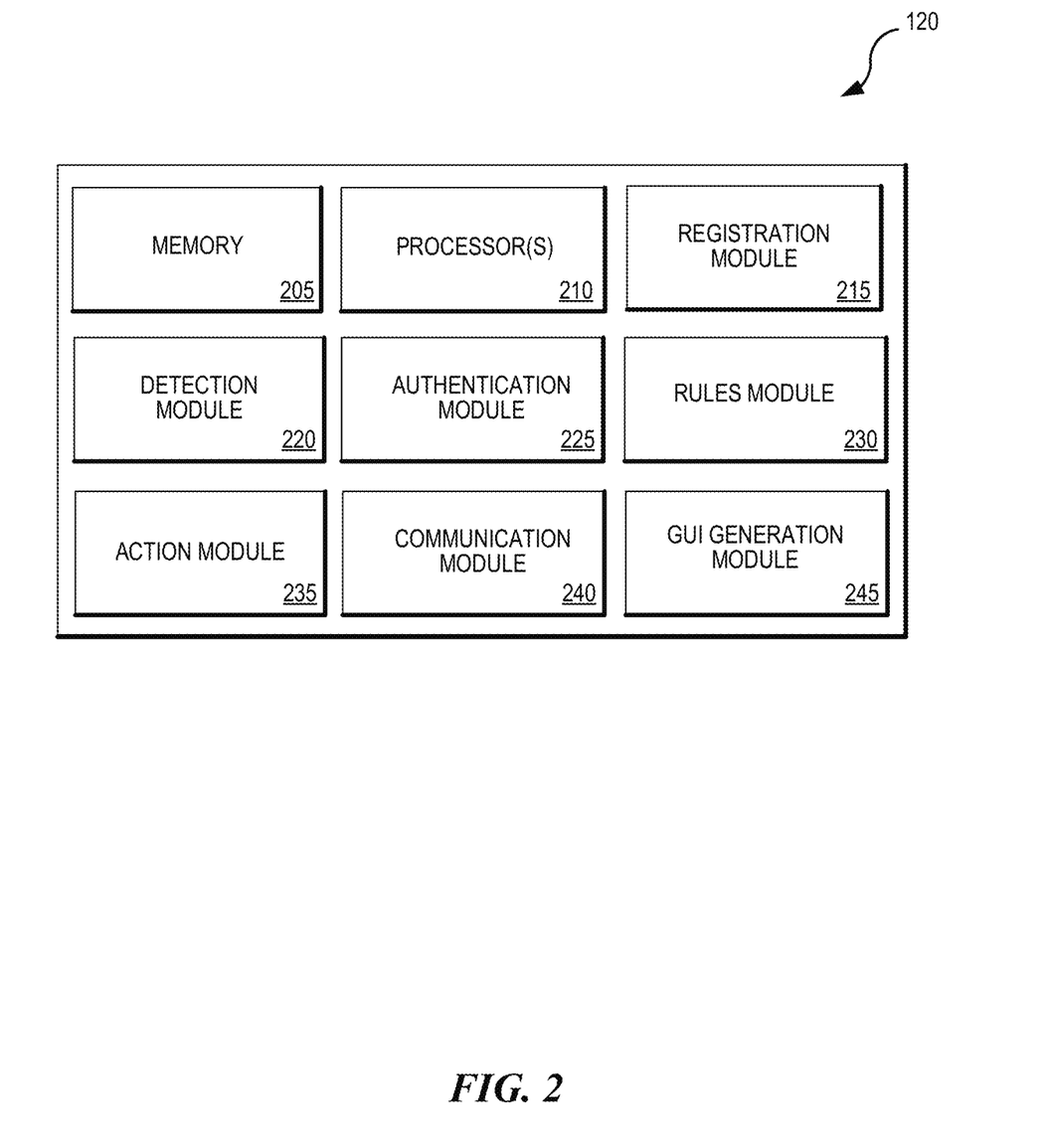
FIG. 2 illustrates various components of a saver button platform that may be used in accordance with various embodiments of the present disclosure.

FIG. 2 illustrates a set of components within saver button platform 120 according to one or more embodiments of the present disclosure. In some embodiments, some or all of these components can be included inside computing devices 110A-110M and/or saver button 135. For example, if computing devices 110A-110M are being used as a proxy to transfer information, then some information can be processed by computing devices 110A-110M (e.g., identification, authentication).

According to the embodiments shown in FIG. 2, saver button platform 120 can include memory 205, one or more processors 210, registration module 215, detection module 220, authentication module 225, rules module 230, action module 235, communication module 240, and graphical user interface (GUI) generation module 245. Other embodiments of the present invention may include some, all, or none of these modules and components along with other modules, applications, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of registration module 215, detection module 220, authentication module 225, rules module 230, action module 235, communication module 240, and GUI generation module 245. Generally, memory 205 can include any device, mechanism, or populated data structure used for storing information. In accordance with some embodiments of the present disclosure, memory 205 can encompass, but is not limited to, any type of volatile memory, non-volatile memory, and dynamic memory. For example, memory 205 can be random-access memory, memory storage devices, optical memory devices, magnetic media, floppy disks, magnetic tapes, hard drives, SIMMs, SDRAM, DIMMs, RDRAM, DDR RAM, SODIMMS, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Registration module 215 can receive a request to register a saver button for a user. When registering a saver button, the user can provide an identifier of the saver button (e.g., saver button serial number) and set up a password for the saver button. The user may be required to pair the saver button to the user's mobile device (e.g., using Bluetooth). Once the pairing is complete, the saver button may provide a visual (or other sensory) indication. The user can give a name to the saver button. In some embodiments, the user provides additional or other network or device information (e.g., a wireless network) so that saving requests can be transferred and executed. The saver button may be paired with more than one user device.

After providing the device and/or network information, the user may provide one or more accounts to transfer funds from, one or more accounts to transfer funds to, and an amount to transfer per button push. The user can further specify user preferences such as if/when to receive reminders and/or notifications, and how notifications should look/sound/feel (e.g., different colors, sounds, vibrations). The user may be asked to set up rules or restrictions, such as when to deny requests to transfer (e.g., when an account balance is below a certain level, when the button is pushed more than a certain number of times within a certain period of time, after a certain time of day), which account funds should be transferred to/from (e.g., if the user's child is pressing the button, $5 should be transferred from the user's account to the child's savings account; if the user is pressing the button, $10 should be transferred from the user's checking account to the user's savings account).

In some embodiments, the user can update the rules after the registration process is complete. For example, if a child has completed a task, the user can update the rules to state that the next button push should transfer $5 to her child's account.

Detection module 220 can receive a communication from communication module 230 that detects that a button push has occurred. The communication can be a message that includes information regarding the identity of the saver button (e.g., serial number), the device sending the message (e.g., saver button, proxy such as a mobile computing device), how long the button was pushed for, and who pushed the button. The information regarding who pushed the button may be collected by the saver button by detecting which device was closest in proximity to the saver button during the push (e.g., identified by Bluetooth ID). In other embodiments, the saver button recognizes or records other identifying information (e.g., the user speaks the user's name, collects a fingerprint on the saver button), and such information is provided in the message to detection module 220.

Authentication module 225 can receive authentication information collected by the saver button, such as a fingerprint, a voice print, or a token. Such information can be verified prior to a transfer being performed. In some embodiments, no additional authentication information is needed when the transfer request is received via a network associated with the saver button (e.g., home network, work network).

Rules module 230 can process the request to determine which account should be debited, which account should be credited, whether there are any restrictions, and/or what notifications need to be sent, or it can apply other rules associated with the saver button. Results from the rules module 230 can be sent to action module 235. In some embodiments, before a transfer will take place, the transferring account is required to have a minimum amount of funds. In some embodiments, a maximum amount of funds can be transferred within a given period of time.

Action module 235 can perform the action determined by rules module 230. For example, when rules module 230 determines that a $5 transfer from the user's checking account should be transferred to the user's savings account, action module 235 transfers the funds. Action module 235 can send information confirming that an action took place to communication module 240.

Communication module 240 can facilitate communication with computing devices and/or the savings button directly. For example, communication module 240 can receive, from a network, communications regarding button pushes directly transmitted by the saver button or via a proxy. Communication module 240 can relay information regarding button pushes to detection module 220. Communication module 240 can send messages to the saver button or other devices. For example, communication module 240 can receive information from action module 235 that a transfer is complete or denied and can send this information to the saver button. The saver button can provide a notification to the user indicating whether the transfer occurred (e.g., blinking green light) or was denied (e.g., blinking red light).

GUI generation module 245 can generate one or more GUI screens that allow for interaction with a user. In at least one embodiment, GUI generation module 245 generates a GUI for receiving and/or conveying information (e.g., information relating to registering the saver button) to the user's computing device.

Figure 3:
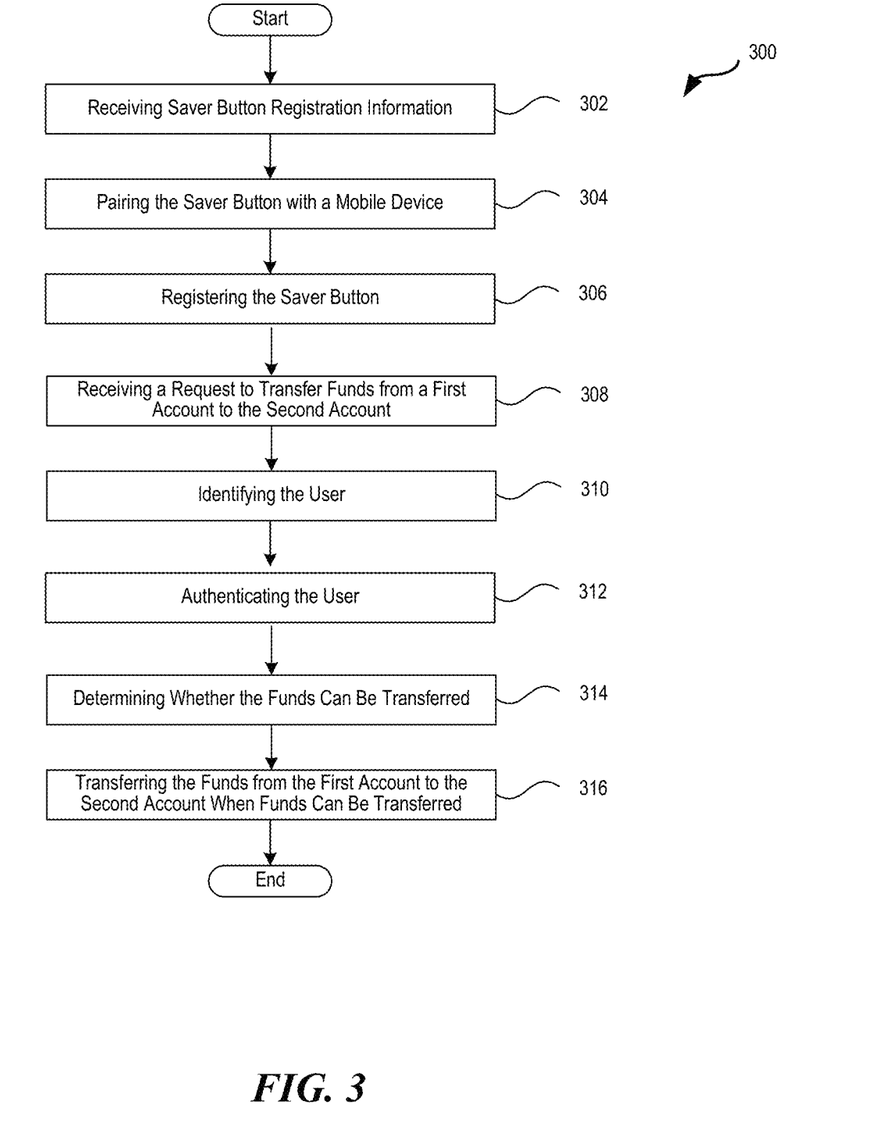
FIG. 3 is a flowchart illustrating a set of operations for registering and processing requests from a saver button in accordance with various embodiments of the present disclosure.

FIG. 3 is a flowchart illustrating a set of operations 300 for registering and processing requests from a saver button. In some embodiments, fewer than all of the operations in each set of operations are performed, whereas in other embodiments additional operations are performed. Moreover, in some embodiments, the operations may be performed in different orders or in parallel. The operations can be performed by various components of the saver button platform 120 illustrated in FIG. 2.

Receiving operation 302 receives saver button registration information such as an identifier of the saver button (e.g., serial number), a user name, a password, accounts to transfer money from, accounts to transfer money to, and additional rules or restrictions (e.g., limits on transfers, minimum transfers, minimum account balances prior to transfer) as part of a registration process. Pairing operation 304 pairs the saver button with a mobile device. After the mobile device has been paired with the saver button, the saver button can detect a proximity of the mobile computing device to decipher between various users who are pushing the button if necessary. In some embodiments, after registration, the saver button sends button push data (e.g., request to transfer funds, length of time the button is pushed, serial number of the saver button) to the mobile device for the mobile device to send the message to the saver button platform. In other embodiments, the saver button sends a message directly to the saver button platform. After account information, rules, and the serial number of the saver button have been received and the saver button has been paired with at least one device, the saver button is registered in registering operation 306.

Receiving operation 308 receives a request from the saver button to transfer funds from a first account to a second account. The saver button may send a message that includes the serial number of the saver button, an identity of a mobile device that is within a certain proximity, details about the button push (e.g., how many times the button was pushed, how long the button was held for, authentication data collected by the button). Identifying operation 310 identifies the user based on the identifier or other information. Authenticating operation 312 authenticates the user. The user can be identified and/or authenticated, for example, by the saver button detecting a device within a proximity of the saver button (e.g., using a Bluetooth address) or a network address or by collecting biometric information. In some embodiments, the funds may be transferred to/from a different account based on a determination of who pushed the saver button.

Determining operation 314 determines whether the funds can be transferred based on rules established by the user and/or the provider. For example, if the user has specified that the user does not want the account from which the funds are to be withdrawn to go below a certain dollar amount, then determining operation 314 checks to ensure that the amount to be transferred will not cause the account balance to dip below the specified dollar amount. If the rules allow for the transfer, transferring operation 316 transfers the funds from the first account to the second account. In some embodiments, a message may be sent to the saver button to notify the user that the funds transfer was completed (e.g., blinking light, confirmation via a spoken message).

Figure 4:
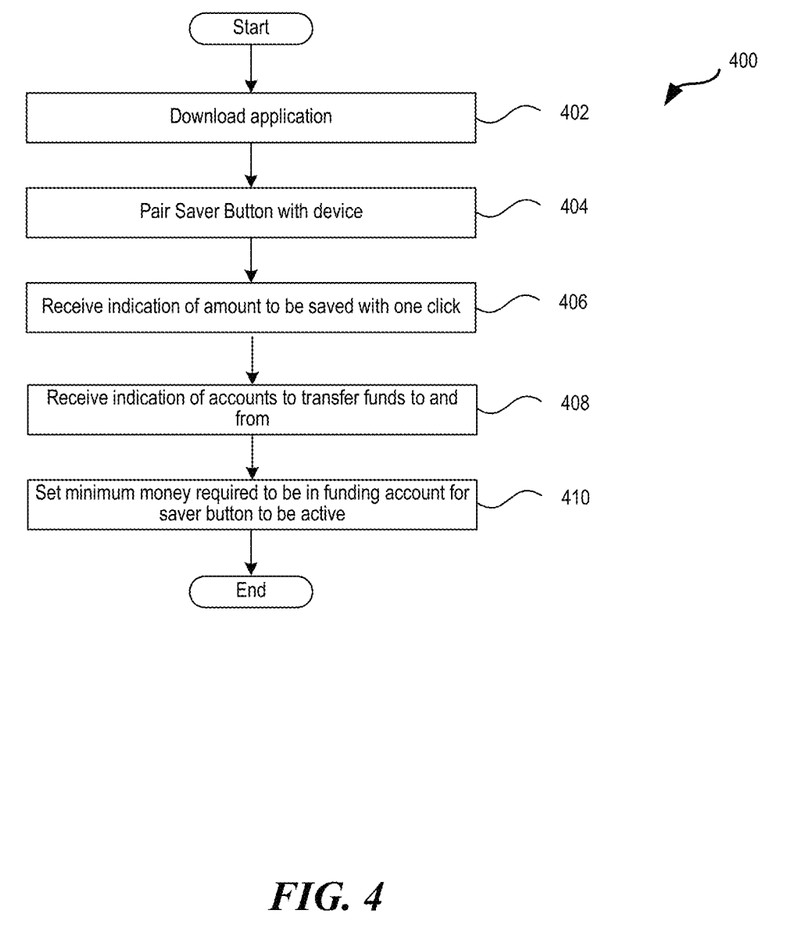
FIG. 4 is a flowchart illustrating a set of operations for registering a saver button in accordance with various embodiments of the present disclosure.

FIG. 4 is a flowchart illustrating a set of operations 400 for registering a saver button using computing device such as computing device 105A-105N. In some embodiments, fewer than all of the operations in each set of operations are performed, whereas in other embodiments additional operations are performed. Moreover, in some embodiments, the operations may be performed in different orders or in parallel. The operations can be performed by various components of the saver button platform 120 illustrated in FIG. 2.

Downloading application 402 downloads an application to a device that allows for registration and setup of a saver button. Pairing operation 404 pairs or otherwise connects the saver button with the device. Receiving operation 406 receives, from a user, an indication of an amount of funds that will be saved when the saver button is clicked. Receiving operation 406 may further receive other selections such as a maximum amount of funds to be transferred within a period of time regardless of the number of saver button clicks (e.g., no more than $50/hour, $100/week). Receiving operation 408 receives an indication of an account to transfer funds to and an account from which to transfer funds from. More than one funding/receiving account can be indicated, though the user may be required to provide additional rules or rely on default rules.

Setting operation 410 sets a minimum amount of funds required to be in the funding account for funds to be transferred when the saver button is clicked. That is, the saver button can be deactivated when the funds are below the minimum threshold (e.g., saver button receives a no transfer message from saver button platform). In some embodiments, the saver button can be active when the funds are below the minimum threshold but when a request to transfer funds is received by the saver button platform, the request is refused.

In some embodiments, during the registration process, the user can specify alternative uses for the button push, such as investing in a certain stock, cashing out certain stock, and paying a bill.

Figure 5:
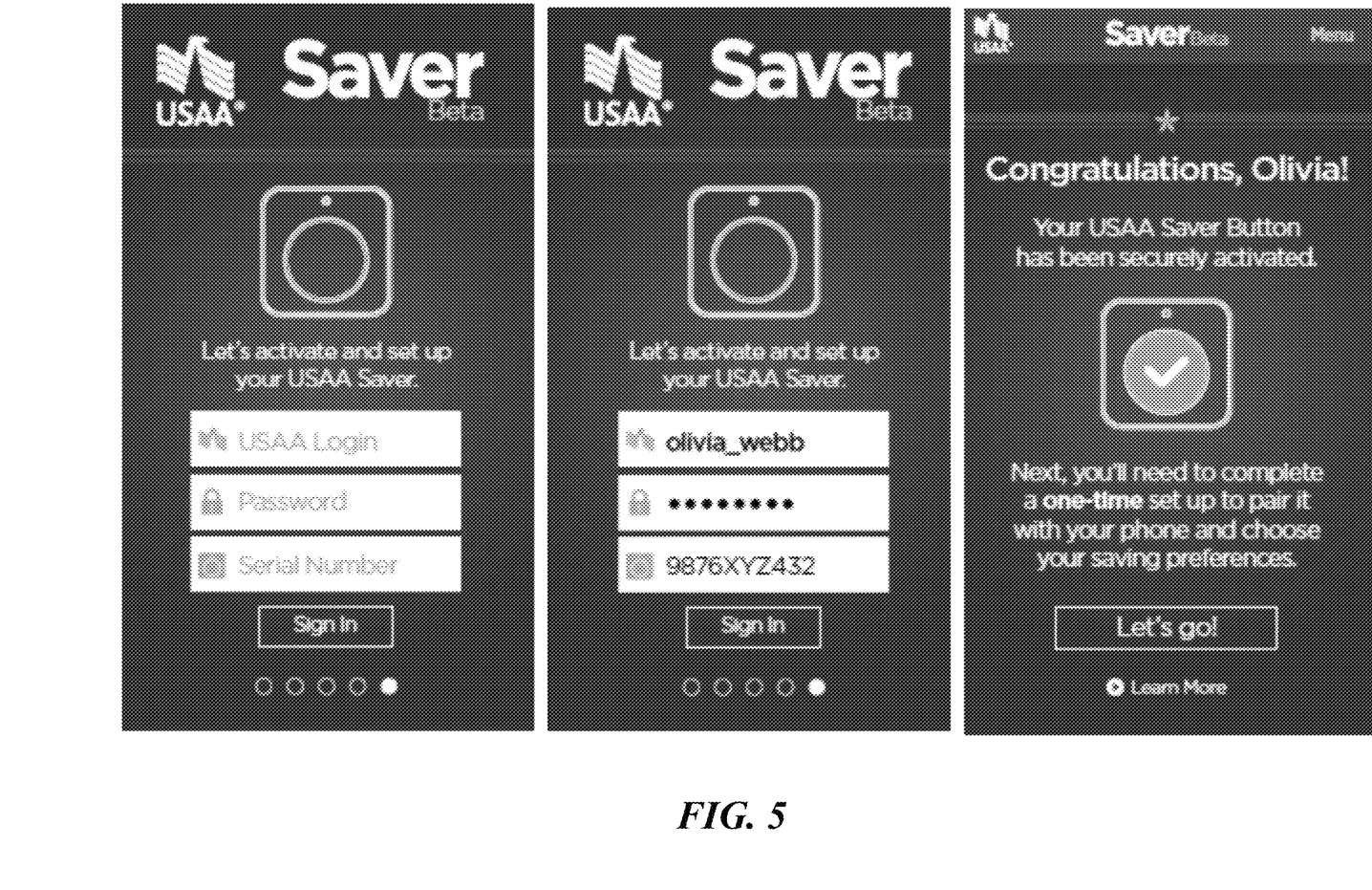
FIGS. 5-9 depict user interfaces for registering a saver button in accordance with various embodiments of the present disclosure.
Figure 6:
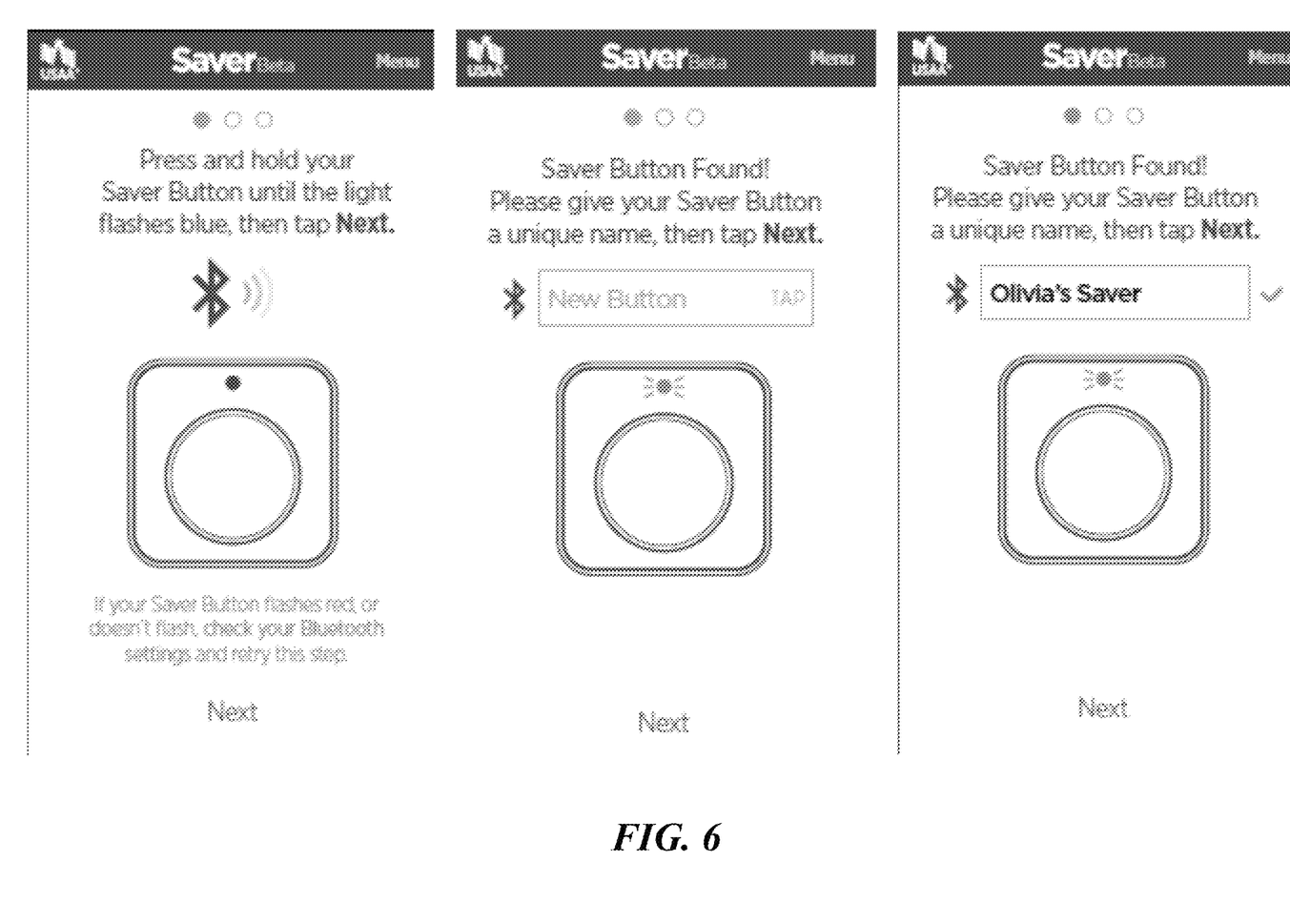
Figure 7:
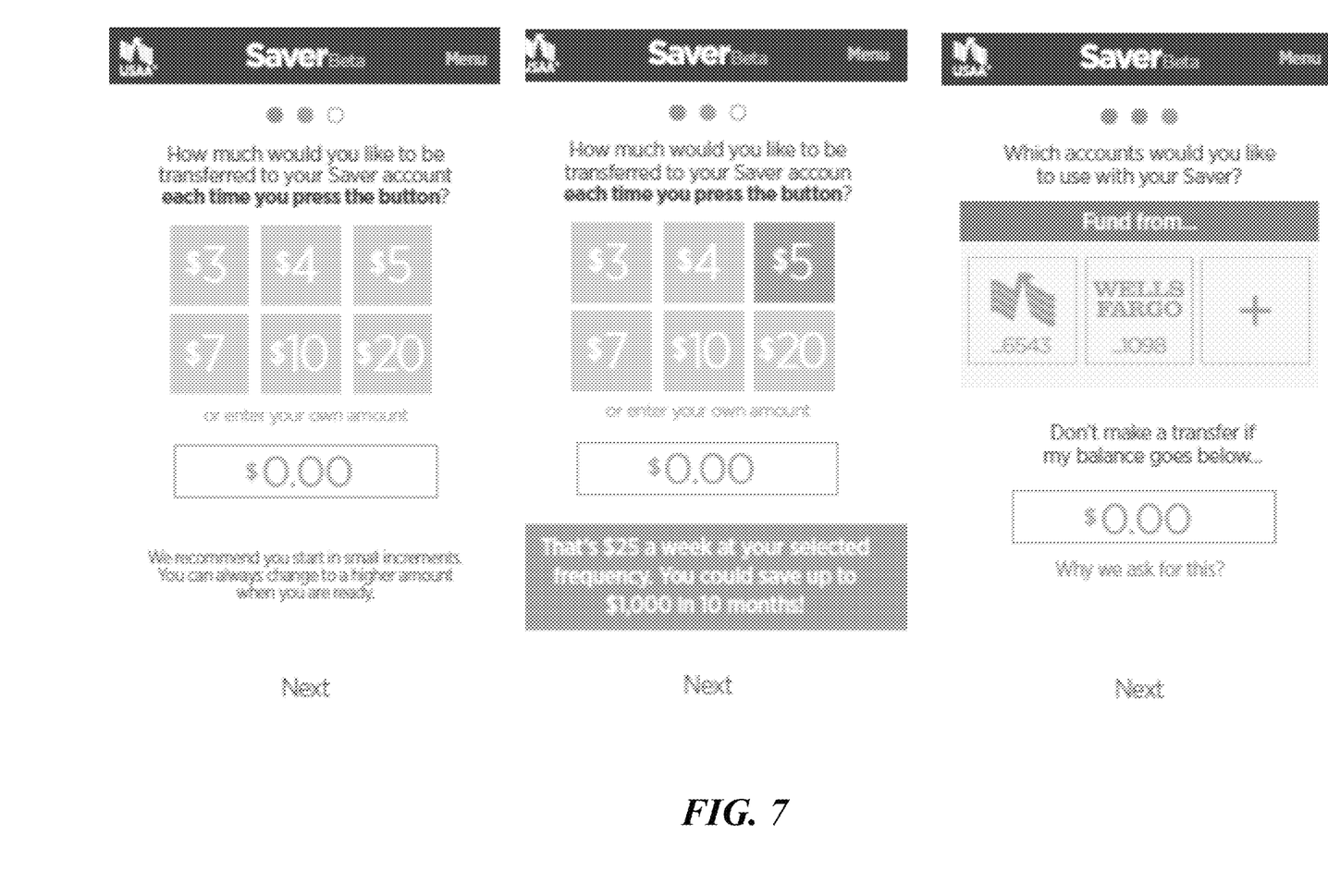
Figure 8:
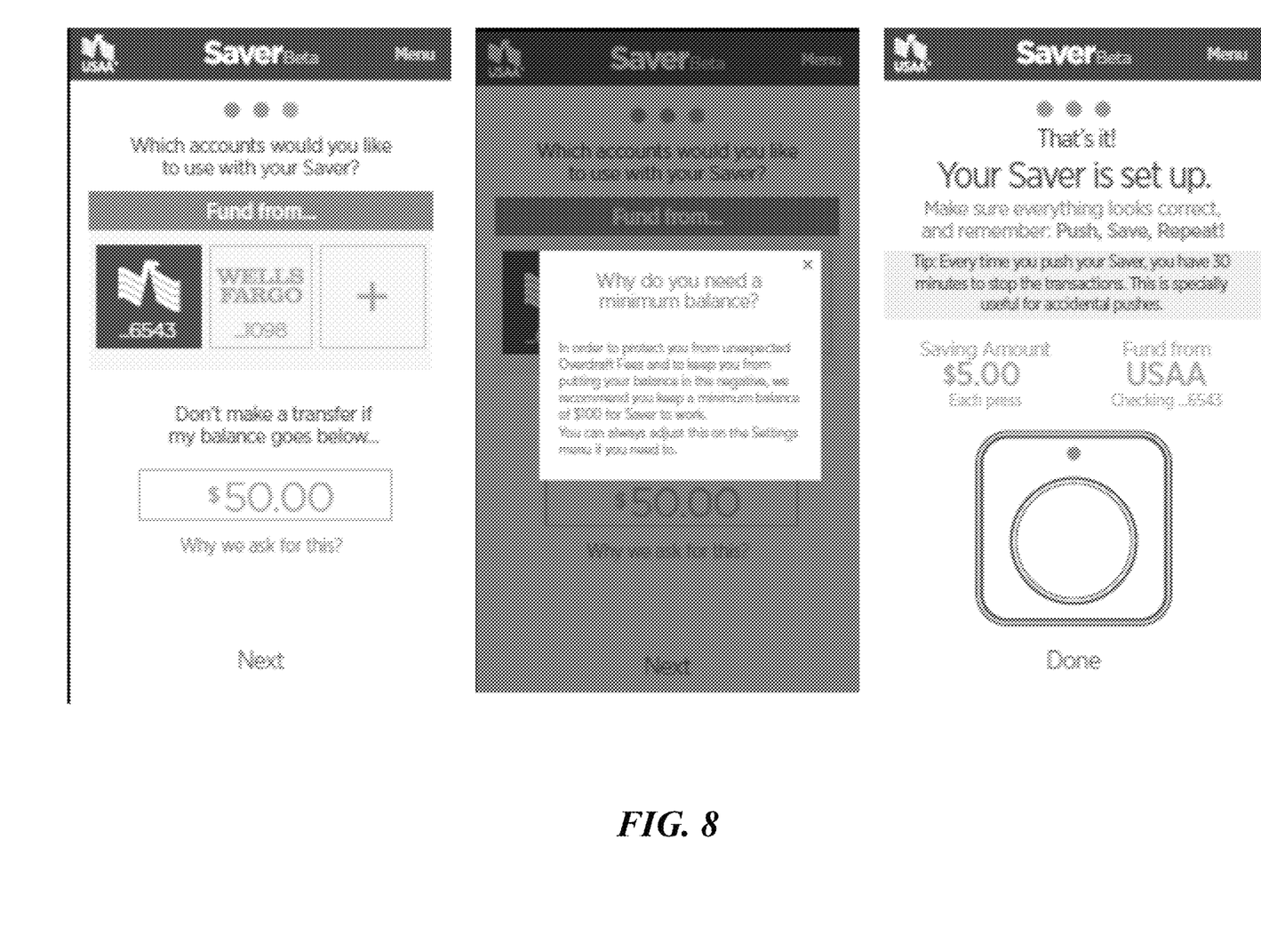
Figure 9:
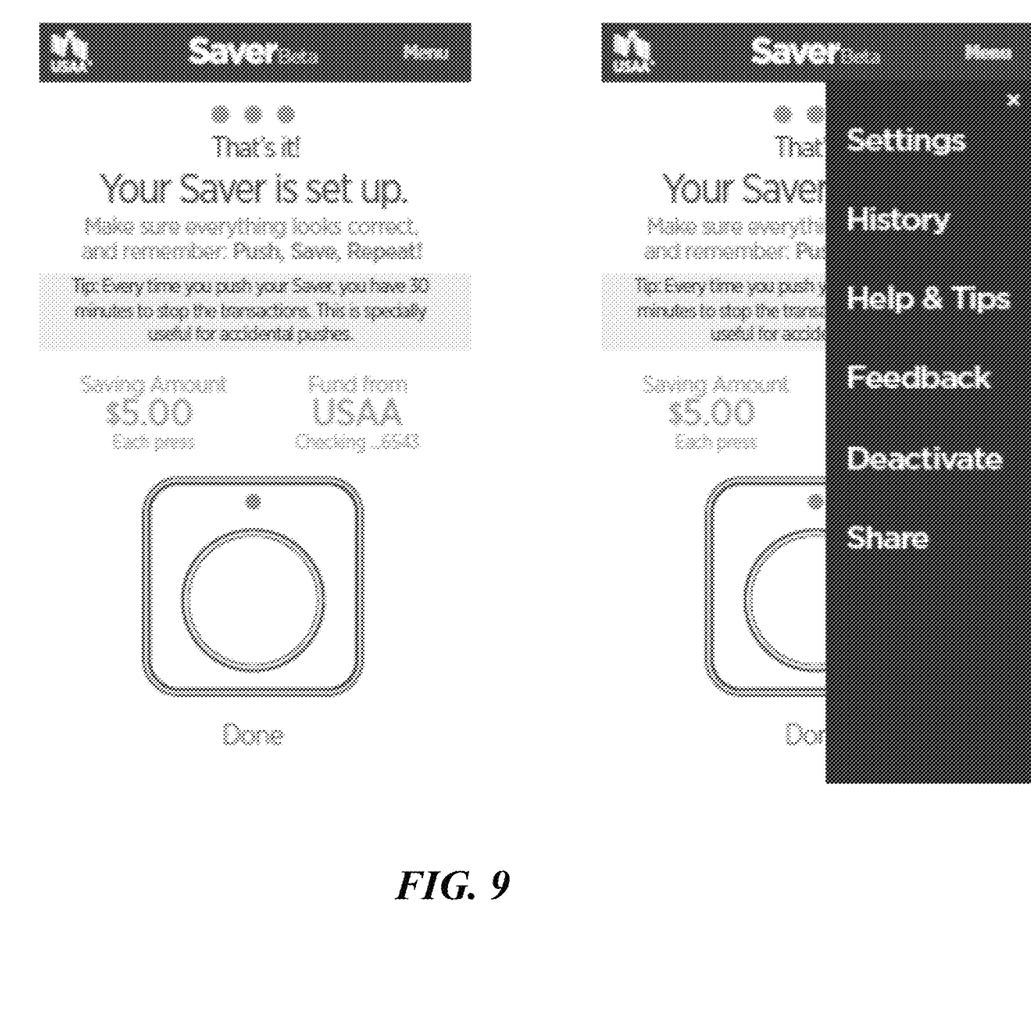

FIGS. 5-9 depict user interfaces for registering a saver button. More specifically, FIG. 5 depicts examples of user interfaces for activating a saver button. The user can provide credentials as well as a serial number of a saver button in an application. FIG. 6 depicts examples of user interfaces for pairing the saver button with a mobile device. FIG. 7 depicts examples of user interfaces allowing a user to select an amount of funds to be transferred when the saver button is pressed and which accounts should be used with the saver button. FIG. 8 depicts examples of user interfaces in which the user specifies a minimum amount of funds that must be available in the funding account before funds will be transferred. FIG. 9 depicts an example of a user interface summarizing the amount of money to be transferred from which account when the saver button is pushed and a menu relating to the saver button (e.g., history of transfers, settings, help, deactivate, share, feedback).

Computer System Overview

Figure 10:
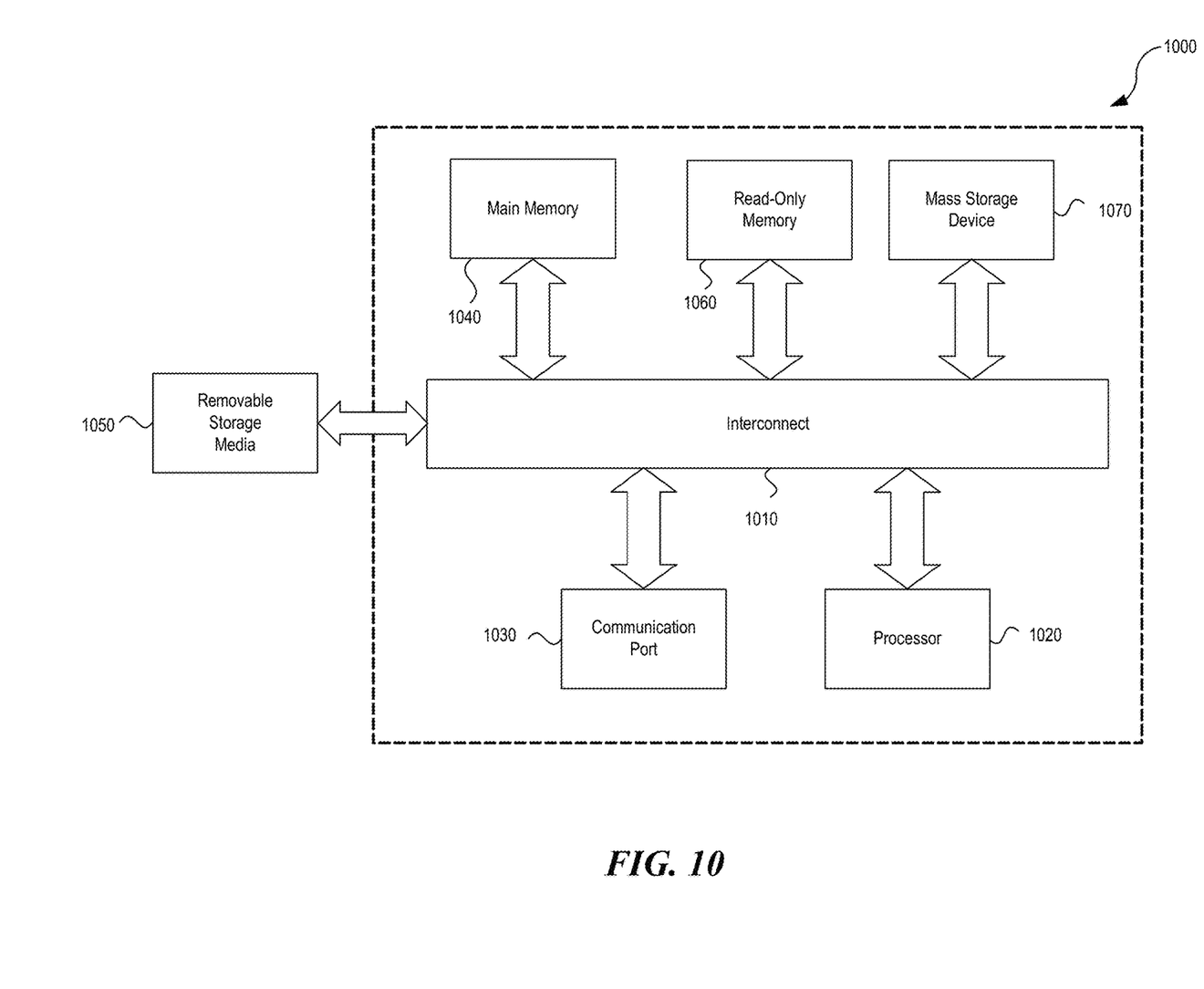
FIG. 10 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 10 is an example of a computer system 1000 with which embodiments of the present disclosure may be utilized. According to the present example, the computer system includes an interconnect 1010, at least one processor 1020, at least one communication port 1030, a main memory 1040, a removable storage media 1050, a read-only memory 1060, and a mass storage device 1070.

Processor(s) 1020 can be any known processor, such as, but not limited to, Intel® Itanium® or Itanium 2® processor(s), or AMD® Opteron® or Athlon MP® processor(s), or Motorola® lines of processors. Communication port(s) 1030 can be any of an RS-232 port for use with a modem-based dial-up connection, a 10/100 Ethernet port, or a Gigabit port using copper or fiber. Communication port(s) 1030 may be chosen depending on a network, such a local area network (LAN), wide area network (WAN), or any network to which the computer system 1000 connects.

Main memory 1040 can be random-access memory (RAM) or any other dynamic storage device(s) commonly known in the art. Read-only memory 1060 can be any static storage device(s), such as programmable read-only memory (PROM) chips for storing static information, such as instructions for processor 1020.

Mass storage device 1070 can be used to store information and instructions. For example, hard disks such as the Adaptec® family of SCSI drives, an optical disc, an array of disks such as RAID, the Adaptec family of RAID drives, or any other mass storage devices may be used.

Interconnect 1010 communicatively couples processor(s) 1020 with the other memory, storage, and communication blocks. Interconnect 1010 can be a PCI/PCI-X- or SCSI-based system bus, depending on the storage devices used.

Removable storage media 1050 can be any kind of external hard drives, floppy drives, IOMEGA® Zip Drives, CD-ROM, compact disc re-writable (CD-RW), or digital video disc read-only memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a local area network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs) interconnected via gateways operable to facilitate communication between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

In conclusion, the present disclosure discloses novel systems, methods, and arrangements for a saver button. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A computing system comprising:
one or more processors; and
one or more memories storing instructions that, when executed by the one or more processors, cause the computing system to perform a process comprising:
receiving, at a saver platform, a set of transfer rules for a saver button device;
identifying, at the saver platform, a first account to transfer money from and a second account to transfer money to, the identifying based on an identity of a user associated with the saver button device;
receiving, at the saver platform, a message originating from the saver button device that includes a request to transfer funds from the first account to the second account, wherein the message includes characteristics associated with the saver button device being depressed;
determining, at the saver platform, that the funds can be transferred from the first account to the second account based on A) the set of transfer rules and B) a proximity of the mobile computing device to the saver button device;
determining, at the saver platform, an amount of the funds to transfer based on the set of transfer rules, wherein the set of transfer rules indicates an amount of the funds to transfer according to the characteristics associated with the saver button device being depressed; and
transferring, from the saver platform the determined amount of funds from the first account to the second account.

2. The computing system of claim 1, wherein the saver button device is wirelessly connected to a mobile computing device and the message was sent via the mobile computing device.

3. The computing system of claim 1,
wherein the saver button device is authenticated by collecting biometric information that is stored in at least one data store of the computing system; and
wherein the message is generated after the authentication of the saver button device.

4. The computing system of claim 1,
wherein the process further comprises sending a message to the saver button device to indicate that the transfer occurred, and
wherein the message indicating that the transfer occurred causes a notification that the transfer occurred to be provided on the saver button device.

5. The computing system of claim 1, wherein the set of transfer rules include a first rule that the funds can be transferred when a minimum amount of funds are available in the first account and a second rule setting a maximum amount of funds that can be transferred within a period of time.

6. The computing system of claim 1, wherein the set of transfer rules define the first account and the second account based on user specifications of the first account and second account during a setup process for the saver button device.

7. The computing system of claim 1, wherein the saver button device sent the message over a WiFi connection.

8. A method comprising:
receiving, at a saver platform, a set of transfer rules for a saver button device including:
a first identification of a first account to transfer money from; and
a second identification of a second account to transfer money to;
wherein the first and second identifications were selected from accounts of a user of a mobile computing device wirelessly connected to the saver button device;
receiving, at the saver platform, a message indicating a request to transfer funds, wherein the message includes characteristics associated with the saver button device being depressed;
determining, at the saver platform, that the funds can be transferred from the first account to the second account based on A) the set of transfer rules and B) a proximity of the mobile computing device to the saver button device;
determining, at the saver platform, an amount of the funds to transfer based on the set of transfer rules, wherein the set of transfer rules indicates an amount of the funds to transfer according to the characteristics associated with the saver button device being depressed; and
transferring, from the saver platform, the determined amount of funds from the first account to the second account.

9. The method of claim 8 further comprising:
identifying a third account to transfer funds to; and
selecting, based on the set of transfer rules, the second account, from among the second account and third account, to receive the transfer of the funds.

10. The method of claim 8,
wherein the mobile computing device and a second mobile computing device are paired with the saver button device; and
wherein the characteristics associated with the saver button device being depressed include an indication of a proximity of the mobile computing device to the saver button device and an indication of a proximity of the second mobile computing device to the saver button device; and
wherein the first account and second account are selected for the funds transfer based on the proximity of the mobile computing device to the saver button being closer than a proximity of the second mobile computing device to the saver button device.

11. The method of claim 8 further comprising:
collecting biometric information; and
authenticating the saver button device based on the biometric information.

12. The method of claim 8, wherein the set of transfer rules include a first rule that the funds can be transferred when a minimum amount of funds are available in the first account and a second rule setting a maximum amount of funds that can be transferred within a period of time.

13. The method of claim 8 further comprising receiving a message each time the saver button device is depressed, wherein the characteristics associated with the saver button device being depressed include an amount of time the saver button device was depressed.

14. The method of claim 13, wherein the amount of funds to be transferred is proportional to the amount of time the saver button device was depressed.

15. The method of claim 8, further comprising sending a message to the saver button device to indicate that the transfer occurred, wherein the message indicating that the transfer occurred causes a notification that the transfer occurred to be provided by the saver button device.

16. A non-transitory computer-readable storage medium storing instructions that, when executed by a computing system, cause the computing system to perform a process comprising:
receiving, at a saver platform, a set of transfer rules for a saver button device including:
a first identification of a first account to transfer money from; and
a second identification of a second account to transfer money to;
wherein the first and second identifications were selected from accounts of a user of a mobile computing device associated with the saver button device;
receiving, at the saver platform, a message indicating the saver button device was pressed,
wherein the message includes characteristics associated with the saver button device being depressed;

determining, at the saver platform, specifics of a funds transfer based on the characteristics associated with the saver button device being depressed;

determining, at the saver platform, that the funds can be transferred from the first account to the second account based on A) the set of transfer rules and B) a proximity of the mobile computing device to the saver button device; and at the saver platform, the funds transfer to occur, from the first account to the second account, with the determined specifics.

17. The non-transitory computer-readable storage medium of claim 16, wherein the mobile computing device and a second mobile computing device are paired with the saver button device; and wherein the characteristics associated with the saver button device being depressed include an indication of a proximity of the mobile computing device to the saver button device and an indication of a proximity of the second mobile computing device to the saver button device; and wherein determining specifics of a funds transfer include identifying the first account and second account for the funds transfer based on the proximity of the mobile computing device to the saver button device being closer than a proximity of the second mobile computing device to the saver button device.

18. The non-transitory computer-readable storage medium of claim 16, wherein the set of transfer rules include a rule that the funds can be transferred only when a minimum amount of funds are available in the first account.

19. The non-transitory computer-readable storage medium of claim 16, wherein the process further comprises receiving a message each time the saver button device is depressed; and wherein the set of transfer rules include a rule that specifies a pre-defined amount of funds to transfer each time the saver button device is depressed.

20. The non-transitory computer-readable storage medium of claim 16, wherein the saver button device is connected to a WiFi connection and sent the message over the WiFi connection.

* * * * *